United States Patent Office 2,947,715
Patented Aug. 2, 1960

2,947,715

TWO-STEP CREAMING PROCESS FOR THE PREPARATION OF EMULSION LATICES FROM HYDROCARBON POLYMER

Elphege Maxime Charlet and Augustus Bailey Small, Baton Rouge, La., assignors to Esso Research and Engineering Company, a corporation of Delaware No Drawing. Filed July 13, 1955, Ser. No. 521,872

21 Claims. (Cl. 260—29.6)

This invention relates to improvements in the preparation of emulsion latices from hydrocarbon polymers and more particularly relates to a method for preparing stable emulsions from solutions of hydrocarbon polymers.

It has been known for some time that very stable latices of high polymer materials may be produced by the emulsion polymerization technique. However, it is often desired to prepare emulsions from already prepared solid rubbery and resinous materials, such as those prepared by Friedel-Crafts catalyst and alkali metal catalyst polymerization techniques. Emulsions of these materials are generally prepared by working large amounts of emulsifiers, up to 50% or more on polymer, into the solid polymer, plus some water to give a thick water-rubber emulsion and then inverting to give the rubber-in-water emulsion or latex. Because of the necessity of using excessive amounts of emulsifying agents, which is undesirable for most uses, the solution technique has often been employed. According to this method the polymer is dissolved in a suitable solvent and the emulsifier and water added while stirring. The solvent is then stripped from the resulting emulsion to form the aqueous latex. This latex is then concentrated by creaming.

The solvent removal step is a very rigorous one and up to the present time it has not been found possible to develop an emulsion system which is sufficiently stable after removal of the solvent to be commercially attractive. A marketable latex of this type represents a high order of coordination of materials and properties, since the emulsion must be stable for extended periods of time under wide variations in treatment and handling. The latex must be stable when allowed to stand for weeks and preferably for months under all conditions of temperature. If the emulsion is ultimately to be used in paints, then it also must be stable to brushing, spraying, etc.

Furthermore, serious difficulty with foaming is often encountered during stripping when the usual solution technique is employed. It is necessary to use a large amount of emulsifier to obtain the initial emulsion but this causes excess foaming when the emulsion is stripped.

The course of the emulsification and stability of the final latex is also strongly influenced by the emulsifying agents employed. The physical and chemical properties of the latex are greatly affected by the nature of the emulsifiers used in the emulsification step. Latices are classified as anionic, cationic or non-ionic according to the type of emulsifier used. Non-ionic systems are compatible with the other two, but anionic and cationic systems are incompatible. Each of these classes usually imparts certain general characteristics to a latex and each individual emulsifier within a given class often imparts a specific property to the latex.

It is, therefore, a major object of this invention to provide a method for preparing stable emulsions of polymeric or resinous materials.

It is a further object of this invention to provide a method for emulsifying solutions of hydrocarbon polymers and resins which remain stable after removal of the solvent.

It is a still further object of this invention to provide an improved method for concentrating the emulsion by creaming before stripping that enables excess of emulsifier to be removed so that foaming difficulties are reduced during stripping.

Another object of the invention is to provide an emulsifier for a given polymer which will render the resulting emulsion highly stable to processing and to storage.

It is again another object of this invention to provide a method for preparing a concentrated aqueous latex from solutions of hydrocarbon polymers in which the factors of solvent removal, latex concentration, and emulsifier are so coordinated that the emulsion is stable through each step of processing, may be stored for long periods of time without deterioration, and possesses a high degree of mechanical and chemical stability.

These and other objects of this invention are accomplished by dissolving the rubber or resin in a suitable solvent, adding a creaming agent to the polymer solution during emulsification, and creaming the resultant latex prior to removal of the solvent, removing the solvent and then again creaming the solvent-free latex.

Thus, according to one embodiment of the invention, the polymeric hydrocarbon is dissolved in a suitable solvent and emulsified with about equal quantities of water. A suitable creaming agent is added at this point and the emulsion is allowed to settle, whereby about half of the water is separated out. The solvent is then removed from the enriched latex layer by stripping with wet nitrogen or other inert gas until the solvent is essentially removed. The emulsion is then heated under vacuum for a short time to remove the last traces of solvent. The solvent-free latex is then set to cream again. It is not necessary to add additional creaming agent at this point, although it can be done if desired. Excellent creaming is again obtained yielding a latex about 40–50% solids. In both creaming steps the separated water is completely free of polymer.

According to another embodiment of this invention, the emulsification step is carried out in the presence of very specific emulsifiers which consist of a mixture of a specific non-ionic emulsifier and a specific anionic emulsifier.

In another embodiment of the invention the latex prepared as described above is mixed with twice the amount of a cationic emulsifier necessary to react with and destroy all of the anionic emulsifier thus leaving an equal amount of the cationic emulsifier in the finished emulsion so that it possesses the properties of a non-ionic cationic system.

Another embodiment of this invention resides in the preparation of a completely non-ionic system by employing a non-ionic emulsifier which is soluble in the hydrocarbon polymer-solution and another non-ionic emulsifier which is soluble in the water. The hydrocarbon and water phases are then emulsified by high-speed mixing. The resulting emulsion is then concentrated by the sequence of steps described above.

The polymers which may be emulsified in accordance with the present invention include polyisobutylene, prepared by the low temperature polymerization of isobutylene with Friedel-Crafts caatlysts; butyl rubber vulcanized elastic copolymers of isobutylene and small amounts of diolefins, e.g., a copolymer of about 97% isobutylene and 3% isoprene prepared similarly to polyisobutylene; a copolymer of 10–90% isobutylene and 90–10% styrene also prepared at low temperatures with Friedel-Crafts catalysts; liquid and solid polybutadiene and copolymers of butadiene and styrene prepared by mass polymerization with sodium at temperatures from 30–100° C.; and petroleum resins prepared by the low temperature Friedel-Crafts polymerization of steam-cracked petroleum streams, Suitable solvents in which the polymer may be dissolved include hexane, carbon tetrachloride, disobutylene, heptane, close-cut naphtha, benzene, trichloroethylene, cyclohexane and cyclohexene. More volatile solvents such as pentane can be used but are undesirable since it requires refrigeration to keep them from evaporating.

The emulsifiers used in accordance with this invention belong in general to the three classes mentioned above but all members of these classes will not work under all conditions. The non-ionic emulsifiers found useful in some combinations are the polyoxyalkenated alkyl phenols or alcohols having the formula $$R(OCHR_1CHR_1)_nOH$$

where R is an alkyl, aryl or alkaryl group, $R_1$ is an alkyl group or hydrogen and $n$ is an integer of 4 to 8 to 10 or even higher. The alkene oxide units should represent at least 40% of the total molecular weight of the compound. These compounds are prepared by condensing an alkyl phenol or an alcohol with ethylene oxide or propylene oxide. Commercial compounds which have been found useful in connection with the present invention include certain of the polyoxyethylated alkyl phenols, such as Triton X-100, Triton X-45 and Igepal CO-430 or the polypropylated glycols such as Pluronic F-68.

The anionic emulsifiers useful in certain combinations include sodium lauryl sulfate and the sodium oleyl taurate prepared by condensing abietic acid or tall oil acid with sodium methyl taurine and known as Igepon TK-42.

The cationic emulsifiers useful in combinations include the alkyl dimethyl benzyl ammonium chlorides, diisobutyl phenoxyethoxyethyl dimethyl benzyl ammonium chloride and dimethyl phenoxyethoxyethyl dimethyl benzyl ammonium chloride.

As pointed out above these emulsifierss cannot be used indiscriminately or interchangeably even within each group since stable emulsions cannot be formed with many combinations.

In accordance with one specific embodiment of this invention, it has been discovered that a very effective emulsifier which produces excellent latices having a very great mechanical and chemical stability consists of a mixture of 10 parts of a polyoxyethylated octyl phenol containing 8 to 10 ethylene oxide units, and known under the trade name of Triton X-100, with one part of sodium lauryl sulfate. Instead of Triton X-100, a polypropylene glycol-ethylene oxide condenssation product may be used in which the ethylene oxide units represent 80-90% of the molecular weight and in which the polypropylene glycol has a molecular weight of 1501 to 1800 and which is known under the trade name Pluronic F-68.

Another excellent emulsifier is an equal mixture of Igepon TK-42, Triton X-100 and a polyoxyethylated nonyl phenol having 43% of its molecular weight present as ethylene oxide units (equivalent to 4 ethylene oxide units) and known as Igepal CO-430. The first of the non-ionic emulsifiers mentioned is soluble in the water while the latter is soluble in the hydrocarbon. By using these along with the Igepon TK-42 troubles due to foaming when sodium lauryl sulfate is used are overcome. Sodium lauryl sulfate produces a much more stable latex and may be added to the system after the processing operations are complete if desired.

The initial amount of emulsifier to be used may vary but a desirable amount is enough to leave less than 5.0 wt. percent, based on polymer, in the final latex. During creaming, about one third to one half of the emulsifier is removed in the two creaming steps. For this reason the use of about 15 wt. percent emulsifier based on polymer may be used. However, from 10 to 20% emulsifier based on polymer may be used, if desired.

In preparing the emulsions it is preferred to use distilled water or natural soft water but most waters suitable for human consumption can be used. Hard waters may require preliminary chemical treatment to precipitate the polyvalent minerals thereof in the form of stable compounds which will remain inert to the emulsion ingredients if the precipitated compounds are left in the completed emulsion. The amount of water contained in the emulsion is not critical as long as there is enough water present to produce a stable water-reducible emulsion. Accordingly, therefore, for shipping purposes, as concentrated an emulsion as possible is desirable. The emulsion may be reduced at the time of application by adding whatever water is desired to provide a good working consistency.

Any desired type of creaming agent may be used in the creaming step. Suitable agents include ammonium alginate and sodium carboxymethyl cellulose.

The advantages of the invention will be better understood from a consideration of the following experimental data which are given for the sake of illustration, but without intention of limiting the invention thereto.

*Example I*

Equal parts of water and a solution of 5-10% Butyl rubber in hexane were emulsified in the presence of ten parts (per hundred parts rubber) of Triton X-100 (a commercial polyoxyethylated octyl phenol containing 8 to 10 ethylene oxide units) and one part of sodium lauryl sulfate using a high speed mixer. While the emulsion was being prepared 1-2% of ammonium alginate, based on Butyl rubber, was added to the mix as a creaming agent. After emulsification the mixture was allowed to stand for about 12 hours, whereupon about half of the water separated out yielding an enriched latex layer. Wet nitrogen was then passed through the latex layer for a time sufficient to remove the bulk of the solvent. The remainder was removed by boiling under vacuum at temperatures up to 150° F. After removal of the solvent the latex spontaneously creamed again upon standing without any further addition of creaming agent, yielding a latex containing about 40% solids. Substantially no coagulation occurred during any of the steps of the process. The resultant final latex possessed excellent storage, mechanical and chemical stability and could be heated to 150° F. for hours without ill effects.

The 10/1 ratio of polyether alcohol to lauryl sulfate in the emulsifier is critical as shown by the following data:

| Run No. | Percent on Polymer | | Ratio, A/S | Stability | |
|---|---|---|---|---|---|
| | A [1] | S [2] | | Initial Emulsion | Finished Latex |
| 1 | 10 | 1.0 | 10/1 | Excellent | Excellent. |
| 2 | 20 | 2.0 | 10/1 | ___do___ | Do. |
| 3 | 15 | 1.5 | 10/1 | ___do___ | Do. |
| 4 | 15 | 1.5 | 10/1 | ___do___ | Do. |
| 5 | 15 | 1.5 | 10/1 | ___do___ | Do. |
| 6 | 15 | 1.5 | 10/1 | ___do___ | Do. |
| 7 | 15 | 1.5 | 10/1 | ___do___ | Do. |
| 8 | 15 | 1.5 | 10/1 | ___do___ | Do. |
| 9 | 0 | 3.0 | 100% S | Poor | |
| 10 | 22.2 | 0.8 | 20/1 | ___do___ | |
| 11 | 5.0 | 5.0 | 1/1 | ___do___ | |
| 12 | 15.0 | 5.0 | 3/1 | ___do___ | |

[1] Triton X-100.
[2] Sodium lauryl sulfate.

The above data clearly show that a stable emulsion is formed only when employing a ratio of ten parts of Triton X-100 and 1 part of sodium lauryl sulfate.

*Example II*

A 10% solution of Butyl rubber in hexane was emulsified with a mixture of 15% of Triton X-100, based on polymer, and 5% of Triton X-45 (a commercial polyoxyethylenated octyl phenol containing 5 ethylene oxide units). The Triton X-100 was dissolved in the water and the Triton X-45 was dissolved in the rubber solution prior to mixing. Equal volumes of rubber solution and water were emulsified in a high speed mixer with the rubber solution being added in a fine stream to the water. About 2%, based on the polymer, of ammonium alginate was added to the mixture during emulsification as creaming agent. The resultant emulsion was creamed before solvent removal and one-half of the initial water used was withdrawn. The concentrated emulsion was stripped free of hexane using wet nitrogen followed by brief vacuum distillation for removal of the last traces of solvent. It was then set aside for a second creaming without the use of additional creaming agent. The resulting concentrated latex contained about 40% solids on polymer and possessed good stability.

Example III

Equal mixtures of water and 5% polyisobutylene in hexane were emulsified by adding one part of Igepal CO-430 (a commercial polyoxyethylenated nonyl phenol containing 4 ethylene oxide units) to the polyisobutylene solution, and one part each of Igepon TK-42 and Triton X-100 to the water, and dispersing the water and polyisobutylene. 1-2%, based on the polymer, of ammonium alginate, were added during the emulsification step. Before removing the solvent, about one-half of the water was removed by creaming which occurred within 12 hours. The hexane was then removed by stripping with wet inert nitrogen. After removal of the solvent, 1.5%, based on polymer, of sodium lauryl sulfate was added to promote the stability of the final latex. After the addition of the sodium lauryl sulfate the mixture was again set aside for creaming at which time about two-thirds of the remaining water was removed. The final latex was a very stable emulsion.

The technique of this example affords a method for overcoming the foaming tendencies of the sodium lauryl sulfate. It usually cannot be omitted but by employing the specific emulsifier combination of this example, its addition can be deferred until after processing is complete, at which time its addition is not objectionable.

This experiment was repeated using Butyl rubber instead of polyisobutylene. The resulting latex was equally as good as that described above.

Example IV

Equal quantities of water and a hexane solution of petroleum resin (59%) prepared by the low temperature Friedel-Crafts polymerization of a steam-cracked naphtha fraction were emulsified with 10 parts of Triton X-100 and 1 part by wt. of sodium lauryl sulfate in the presence of sodium carboxy methyl cellulose as creaming agent. The initial emulsion creamed overnight after which the solvent was stripped off. The resultant latex was then creamed a second time. The final latex contained 55.6 wt. percent solids and had a viscosity of .75 poise.

Example V

To 100 cc. of anionic-non-ionic emulsion of Butyl rubber prepared in accordance with Example I and containing about 5% emulsifier consisting of 10 parts of Triton X-100 and 1 part of sodium lauryl sulfate, there was added 4 cc. of a 1% solution of stearyl dimethyl benzyl ammonium chloride. About half of this compound reacted with the sodium lauryl sulfate destroying it as an emulsifier. The other remained unreacted and took the place of the sodium lauryl sulfate as an emulsifier, thus substituting a cationic emulsifier for an anionic one. Absolutely no coagulation took place and the resultant latex had equal or superior hand stability to the original latex. A latex made up with sodium lauryl sulfate as the sole emulsifier coagulated immediately upon the addition of the stearyl dimethyl benzyl ammonium chloride. Thus, the presence of the Triton X-100 is necessary to stabilize the emulsion during the destruction of the sodium lauryl sulfate.

It is also necessary to prepare the original emulsion with the sodium lauryl sulfate present since attempts to emulsify a 10% butyl rubber solution using a mixture of 10 parts of Triton X-100 and one part of stearyl dimethyl benzyl ammonium chloride were completely unsuccessful. An emulsion which would stand even a few minutes without breaking could not be formed.

Example VI 1500 cc. of a 7% solution of polybutene in hexane were slowly added to a mixture of 375 cc. of a 3.0% aqueous solution of Pluronic F-68, 375 cc. of a 0.3% aqueous solution of sodium lauryl sulfate, 750 cc. water, 75 cc. of a 2% aqueous solution of sodium carboxymethyl cellulose. The mixture was agitated during blending and was allowed to cream immediately after preparation. The concentrated latex was then stripped with gas and again allowed to cream. The reconcentrated latex was then vacuum distilled for final removal of the last traces of solvent and again allowed to cream. The final latex contained about 1 to 3% emulsifier. Films cast from this latex were found to be dry, exceptionally tough and adhered strongly to a smooth metal surface.

Attempts were made to prepare latices by the use of Pluronic F-68 and sodium lauryl sulfate separately but unstable emulsions which broke on stripping were produced.

Example VII

Equal portions of Butyl rubber and water and polyisobutylene and water were emulsified using various other types of emulsifiers, either singly or in combination. None of these emulsions proved satisfactory. Either a poor emulsion formed which broke in a short time, or if an emulsion did form it possessed poor stability or the emulsifier caused such excessive foaming that it could not be used. The following data were obtained:

| | Agent | Emulsion | Stability |
|---|---|---|---|
| 1 | Tergitol<br>Na hexametaphosphate<br>Sulfated vegetable oils<br>Petroleum sulfonates<br>Ivory soap | Emulsion broke | |
| 2 | Polyoxyethylated fatty alcohol | do | |
| 3 | Sulfated ethyl ester of fatty acid | do | |
| 4 | Triton X-155 (dimeric diamyl phenoxy polyethoxy ethanol)<br>Petroleum sulfonates | do | |
| 5 | Vel (alkyl aryl sodium sulfonate)<br>Triton X-100 | do | |
| 6 | Igepal CO-430<br>Igepon TK-42 | No foaming | Poor. |

The data in the above examples show that solid rubbery polymers can be emulsified with water to give latices having good mechanical and chemical stability only by the use of certain specific combination of emulsifiers. The combination of 10 parts of Triton X-100 and 1 part of sodium lauryl sulfate has been found to yield latices having the greatest mechanical and chemical stability (Example I). This also affords a means of obtaining a cationic-type emulsion by converting the non-ionic-anionic type to the cationic type as described in Example II. Other satisfactory emulsifier combinations include a mixture of three parts of Triton X-100 and one part of Triton X-45 and a mixture of equal parts of Igepon TK-42, Triton X-100 and Igepal CO-430.

The latices obtained in accordance with this invention are suitable for use in the preparation of foam rubber sponge extenders, paper size, paper shades and drapes, tire-cord coating compositions, emulsion paints, resilient concrete, laminant for paper, wood, canvas and plywood, binder for cork, wood, fiber, and leather buffings, industrial gloves and protective clothing, raincoating, rug-backing and other dipped goods, and in adhesives.

The nature of the present invention having been thus fully set forth and specific examples of the same given, what is claimed as new and useful and desired to be secured by Letters Patent is:

1. Process for preparing hydrocarbon polymer latices which comprises dissolving said polymer in a hydrocarbon solvent, emulsifying the dissolved polymer with water in the presence of about 10 to 20 wt. percent based on polymer of emulsifier, adding a creaming agent to the resulting emulsion whereby an upper latex layer containing the polymer, solvent and some water and a lower aqueous layer are formed, separating the latex layer from the aqueous layer, stripping the solvent from the latex layer, creaming the solvent-free latex layer whereby an upper latex layer and a lower aqueous layer are formed, separating the latex layer from the aqueous layer and recovering a latex containing about 40 to 50 wt. percent solids.

2. Process according to claim 1 in which the polymer is emulsified with a mixture of 10 parts of a polyoxyethylated octyl phenol containing 8 to 10 ethylene oxide units and 1 part sodium lauryl sulfate.

3. Process according to claim 2 in which the polymer is a vulcanized elastic copolymer of isobutylene and a small amount of a diolefin.

4. Process according to claim 2 in which the polymer is a petroleum resin.

5. Process according to claim 2 in which the final latex layer is mixed with twice the amount of stearyl dimethyl benzyl ammonium chloride necessary to convert the sodium lauryl sulfate to the stearyl dimethyl benzyl lauryl sulfate, thereby forming a cationic-nonionic latex.

6. Process according to claim 1 in which the polymer is emulsified with three parts of a polyoxyethylated octyl phenol containing 8 to 10 ethylene oxide units dissolved in the water and 1 part of a polyoxyethylated octyl phenol containing 5 ethylene oxide units dissolved in the hydrocarbon solvent.

7. Process according to claim 6 in which the polymer is a vulcanized elastic copolymer of isobutylene and a small amount of a diolefin.

8. Process according to claim 1 in which the polymer is emulsified with equal amounts of the sodium oleyl taurate, a polyoxyethylated octyl phenol containing 8 to 10 ethylene oxide units and a polyoxyethylated nonyl phenol containing 4 ethylene oxide units.

9. Process according to claim 8 in which sodium lauryl sulfate is added to the finished latex as stabilizing agent.

10. A process for preparing synthetic hydrocarbon polymer latices which comprises dissolving said polymer in a hydrocarbon solvent, emulsifying the dissolved polymer with water in the presence of 10 to 20 wt. percent based on polymer of a mixture of nonionic and anionic emulsifiers with high speed mixing, adding a creaming agent to the resulting emulsion whereby an upper latex layer containing the polymer, solvent and some water, and a lower aqueous layer are formed, separating the latex layer from the aqueous layer, stripping the solvent from the latex layer, creaming the solvent-free latex layer whereby an upper latex layer and a lower aqueous layer are formed, separating the latex layer from the aqueous layer and recovering a latex containing about 40 to 50 wt. percent solids.

11. Process for preparing latices of Butyl rubber consisting of vulcanized elastic copolymers of isobutylene and small amounts of diolefins which comprises dissolving said Butyl rubber in a hydrocarbon solvent, emulsifying the dissolved Butyl rubber with water in the presence of 10 to 20 wt. percent based on polymer of a mixture of nonionic and anionic emulsifiers with high speed mixing, adding a creaming agent to the resulting emulsion whereby an upper latex layer containing the Butyl rubber, solvent and some water, and a lower aqueous layer are formed, separating the latex layer from the aqueous layer, stripping the solvent from the latex layer, creaming the solvent-free latex layer whereby an upper latex layer and a lower aqueous layer are formed, separating the latex layer from the aqueous layer and recovering a latex containing about 40 to 50 wt. percent solids.

12. Process for preparing a hydrocarbon polymer emulsion which comprises emulsifying a hydrocarbon solution of said polymer with water in the presence of a mixture of 10 parts of a polyoxyethylated octyl phenol containing 8 to 10 ethylene oxide units and 1 part of sodium lauryl sulfate, stripping off the hydrocarbon solution and recovering an emulsion containing less than 5 wt. percent of said octyl phenol and lauryl sulfate based on the polymer.

13. Process according to claim 12 in which the polymer is a vulcanized elastic copolymer of isobutylene and a small amount of a diolefin.

14. Process according to claim 12 in which the polymer is a petroleum resin.

15. Process according to claim 12 in which the polymer contains butadiene.

16. Process for preparing a hydrocarbon polymer emulsion which comprises emulsifying a hydrocarbon solution of said polymer with water in the presence of a mixture of 10 parts of a condensation product of a polypropylene glycol having a molecular weight of 1501 to 1800 and ethylene oxide in which the ethylene oxide represents 80–90% of the molecular weight of the condensation product and 1 part of sodium lauryl sulfate, stripping off the hydrocarbon solvent and recovering an emulsion containing less than 5 wt. percent of said condensation product and lauryl sulfate based on the polymer.

17. Process according to claim 16 in which the polymer is polybutene.

18. Process for preparing a hydrocarbon polymer emulsion which comprises emulsifying a hydrocarbon solution of said polymer with water, in the presence of three parts of a polyoxyethylated octyl phenol containing 8 to 10 ethylene oxide units dissolved in the water, and one part of a polyoxyethylated octyl phenol containing 5 ethylene oxide units dissolved in said hydrocarbon solution, stripping off the hydrocarbon solvent and recovering an emulsion containing less than about 5 wt. percent of said phenols based on the polymer.

19. Process according to claim 18 in which the polymer is a vulcanized elastic copolymer of isobutylene and a small amount of a diolefin.

20. Process for preparing a hydrocarbon polymer emulsion which comprises emulsifying a hydrocarbon solution of said polymer with equal amounts of the sodium oleyl taurate, a polyoxyethylated octyl phenol containing 8 to 10 ethylene oxide units, and a polyoxyethylated nonyl phenol containing 4 ethylene oxide units, stripping off the hydrocarbon solvent and recovering an emulsion containing less than about 5 wt. percent of said taurate and phenols based on the polymer.

21. Process according to claim 20 in which the polymer is polybutene.

References Cited in the file of this patent

UNITED STATES PATENTS

| | | |
|---|---|---|
| 2,386,764 | Zwicker | Oct. 16, 1945 |
| 2,386,931 | Carpenter | Oct. 16, 1945 |
| 2,592,526 | Seed | Apr. 15, 1952 |
| 2,595,797 | Leyonmark | May 6, 1952 |
| 2,605,242 | Betts et al. | July 29, 1952 |
| 2,721,145 | Cheromis | Oct. 18, 1955 |
| 2,769,712 | Wilson | Nov. 6, 1956 |

FOREIGN PATENTS

| | | |
|---|---|---|
| 525,656 | Great Britain | Sept. 2, 1940 |

OTHER REFERENCES

Schildknecht: "Vinyl and Related Polymers," page 510, John Wiley and Sons Inc., New York City (1952).